(12) United States Patent
Vachon et al.

(10) Patent No.: US 9,744,488 B2
(45) Date of Patent: Aug. 29, 2017

(54) FILTRATION SYSTEM (71) Applicant: OMEGA LIQUID WASTE SOLUTIONS INC., Longueuil (CA)

(72) Inventors: Tony Vachon, St-Joseph-de-Beauce (CA); Robert Lamarche, Las Vegas, NV (US)

(73) Assignee: OMEGA LIQUID WASTE SOLUTIONS INC., Longueuil (CA)

(*) Notice: Subject to any disclaimer, the term of this patent is extended or adjusted under 35 U.S.C. 154(b) by 286 days.

(21) Appl. No.: 14/430,014

(22) PCT Filed: Oct. 11, 2013

(86) PCT No.: PCT/CA2013/050774
§ 371 (c)(1),
(2) Date: Mar. 20, 2015

(87) PCT Pub. No.: WO2014/059539
PCT Pub. Date: Apr. 24, 2014

(65) Prior Publication Data
US 2015/0283484 A1 Oct. 8, 2015

Related U.S. Application Data

(60) Provisional application No. 61/713,666, filed on Oct. 15, 2012.

(51) Int. Cl.
*B01D 33/11* (2006.01)
*B01D 33/073* (2006.01)
(Continued)

(52) U.S. Cl.
CPC ............ *B01D 33/11* (2013.01); *B01D 33/073* (2013.01); *B01D 33/68* (2013.01); *B01D 33/727* (2013.01)

(58) Field of Classification Search
None
See application file for complete search history.

(56) References Cited

U.S. PATENT DOCUMENTS 4,876,013 A   10/1989  Shmidt et al.
7,993,519 B2   8/2011  Carew
(Continued)

FOREIGN PATENT DOCUMENTS

DE    EP 0164004 A2 * 12/1985 ........... B01D 33/073
DE            4118423 A1    9/1992
(Continued)

*Primary Examiner* — Krishnan S Menon
*Assistant Examiner* — Ryan B Huang
(74) *Attorney, Agent, or Firm* — Norton Rose Fulbright Canada LLP; Alexandre Daoust (57) ABSTRACT

The filtration system having a housing having an inlet, at least one outlet being axially spaced from the inlet and forming a helical purge path therebetween, and a filtrate outlet extending out along the axis, with a flow rate ratio being balanced by flow restriction between the filtrate outlet and the at least one purge outlet during regular operation; a filter element including a filtration membrane and a support membrane mounted concentrically around the axis, at least one of said filtration membrane and support membrane being rotatably mounted to the housing for rotation about the axis to impart a relative rotation speed between the filtration membrane and support membrane during operation; the system being operable to temporarily increase the flow rate ratio through the at least one outlet compared to said regular operation.

17 Claims, 7 Drawing Sheets (51) Int. Cl.
*B01D 33/68* (2006.01)
*B01D 33/72* (2006.01)

(56) References Cited

U.S. PATENT DOCUMENTS

| | | | |
|---|---|---|---|
| 2003/0098273 A1* | 5/2003 | Benenson, Jr. | B01D 29/15 210/393 |
| 2007/0289917 A1* | 12/2007 | Mylin | B01D 65/02 210/435 |
| 2009/0077893 A1 | 3/2009 | Carew | |
| 2012/0055887 A1 | 3/2012 | Love | |

FOREIGN PATENT DOCUMENTS

| | | | | |
|---|---|---|---|---|
| DE | 4137496 A1 * | 5/1993 | | B01D 33/073 |
| EP | 0164004 A2 | 12/1985 | | |
| EP | 0277660 A2 * | 8/1988 | | B01D 9/00 |
| EP | 1258572 A2 | 11/2002 | | |

* cited by examiner

FILTRATION SYSTEM

FIELD

This specification relates to filtration systems which separate solid matter from liquid matter, and more particularly of a filtration system of the rotary membrane type.

BACKGROUND

Various forms of filtration techniques exist, and most forms are adapted to specific filtration scenarios. Generally, existing filtration techniques lead to satisfactory results for filtering liquids having a relatively low concentration of non-abrasive and non-fat solids. There thus remains a need for improved or alternate filtrations techniques adapted to scenarios where the solids are present in relatively high concentrations, include a significant amount of fat, fibers or abrasive substances, and/or simply when the solids include a mix of organic and inorganic substances, especially in relation with features such as system costs, filtration efficiency, durability and maintenance costs.

SUMMARY

In accordance with one aspect, there is provided a method of operating a filtration system for separating particulate solid matter from a liquid and having a housing having a surface of revolution shaped cavity therein defined around an axis, the cavity housing a filter element including a filtration membrane and a support membrane mounted concentrically around the axis with the filtration membrane being rotatably mounted to the housing externally to the support membrane, the housing also having a filtrate outlet located inside the filter element, an inlet and at least one purge outlet, the inlet and the at least one purge outlet both being located outside the filter element; the method comprising: operating the filtration system in a regular filtration mode including simultaneously: feeding an inlet flow rate into the cavity through the inlet; rotating the filtration membrane about the axis, at a rotation speed relative to the support membrane; extracting a filtrate flow rate sequentially across the filter element and the filtrate outlet; and, subsequently temporarily operating the filtration system in a declogging mode including: extracting a greater purge flow rate through the at least one purge outlet than during the regular filtration mode.

In accordance with another aspect, there is provided a filtration system for separating particulate solid matter from a liquid, the filtration system comprising: a housing having a surface of revolution shaped cavity therein defined around an axis, the housing having a tangentially-oriented inlet leading into the cavity in a given tangential direction, at least one purge outlet, and a filtrate outlet extending out from the cavity along the axis; a filter element including a filtration membrane and a support membrane, both being apertured, being of a same surface of revolution shape and being mounted concentrically around the axis, with a spacing distance therebetween, the filtration membrane being rotatably mounted to the housing externally to the support membrane, for rotating about the axis with a rotation speed relative to the support membrane, a filtrate path extending from the inlet to the filtrate outlet across the filter element; a purge path extending from the inlet to the at least one purge outlet, externally from the filtering element; and a declogging valve operable to temporarily increase a flow rate through the at least one purge outlet.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
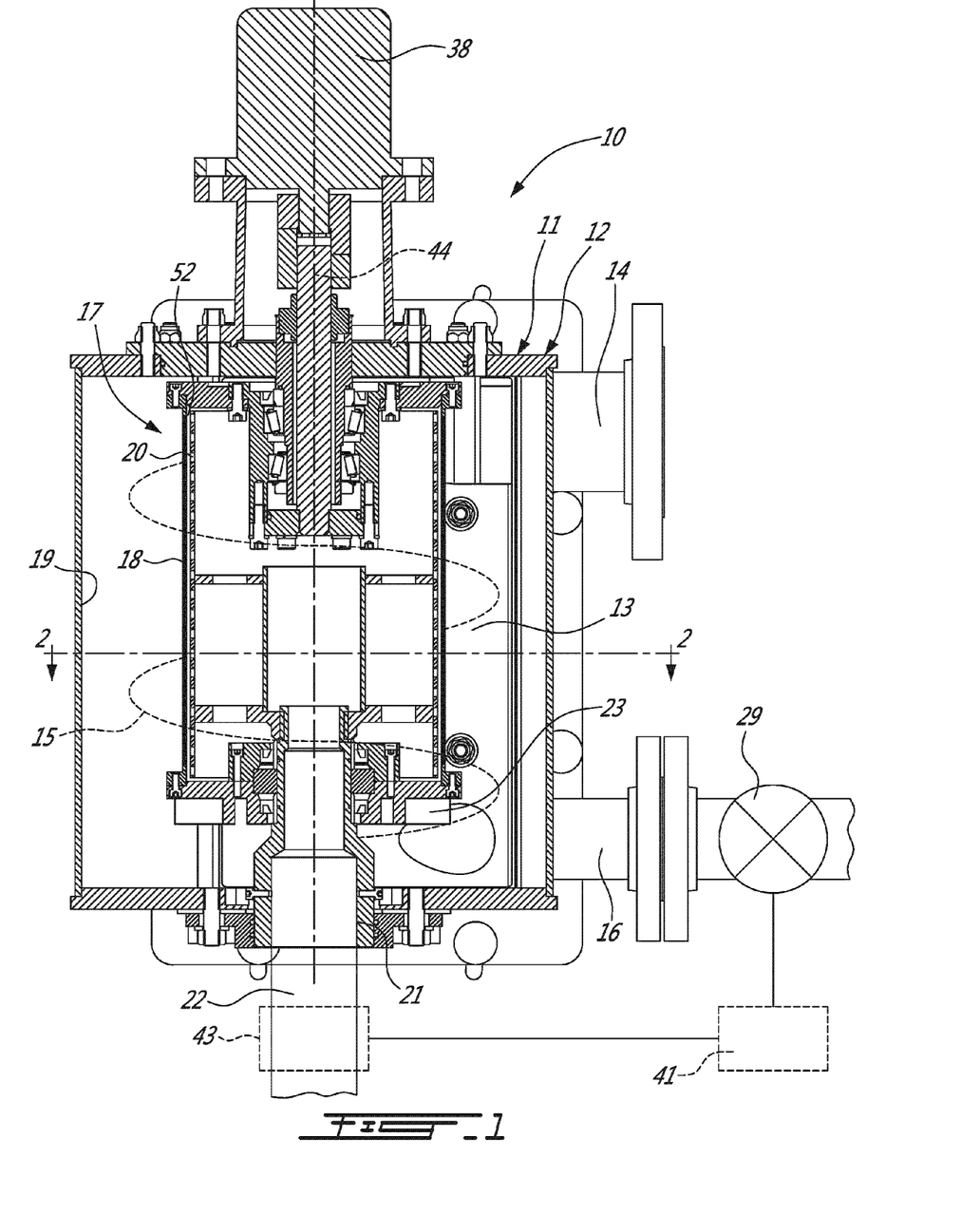
FIG. 1 is a schematic axial cross-section view of a first example of a filtration system.

FIG. 1 shows an example of a filter 11 which can form part of a filtration system 10, in accordance with the improvements. The filtration system 10 has a housing 12 which has an internal cavity 13 generally formed of a solid of revolution shape, defined around an axis 44, and housing a filtration element 17. The housing 12 has an inlet 14 across which the particulate solid matter mixed in a liquid enters the cavity 13, a filtrate outlet 22 which outputs filtered liquid, and a clog-control outlet 16 for evacuating the particulate solid matter. Depending on the embodiments, the housing 12 can have more than two outlets, as will be explained further below.

The inlet 14 and the clog-control outlet 16 are outside the filtration element 17, whereas the filtrate outlet 22 is inside the filtration element 17. Henceforth, the path to the filtrate outlet 22, referred to herein as the filtrate path, extends from the inlet 14 to the filtrate outlet 22 across the filtration element 17.

The filtration element 17 has a filtration membrane 18 and a support membrane 20 mounted to the housing 12 concentrically to one another around the axis 44, spaced from one another by a spacing distance 52, and having a same surface of revolution shape which, in this embodiment, corresponds to the solid of revolution shape of the internal cavity 13. The filtration membrane 18 is rotatably held in the housing 12, and is connected to a motor 38 which is adapted to impart a movement relative to the support membrane 20. In this embodiment, the filtration membrane is rotary and the support membrane 20 is stationary, although in alternate embodiments, the relative speed therebetween could be achieved by also rotating the support membrane at a different rotation speed or in a different rotation direction, for instance. The rotation of the filtration membrane 18 at relatively high velocities, combined with its proximity and relative speed with respect to the support membrane 20, reduces the amount of particulate matter which tends to agglomerate thereon and allows the filtration system 10 to operate for a longer period of time before clogging. The support membrane 20 can thus be said to have a functional support role in the filtration effect support membrane. It will be noted that in this specific embodiment, the filtrate outlet 22 extends axially out from the internal cavity 13, along the axis 44.

In this embodiment, the inlet 14 is oriented tangentially with respect to the axis 44 and therefore, the flow rate into the internal cavity 13 imparts a circular motion around the axis 44. The circular motion, referred to herein as the rotary fluid movement 15, or vortex, imparts a centrifugal acceleration to the particulate matter in the liquid which also contributes to allowing the filtration system 10 to operate for a longer period of time before clogging. The fact that the internal cavity 13 is of solid of revolution shape and has a smooth surface 19 also assists in allowing the establishment of the rotary fluid movement 15 inside the internal cavity 13. In this embodiment, the solid of revolution shape is a cylinder, though it will be understood by persons of skill in the art reading this disclosure that solid of revolution shapes having a conical aspect, a spherical aspect, a combination of conical, cylindrical and/or spherical aspects, etc., could be satisfactory as well depending on the application.

In this embodiment, the relative movement between the filtration membrane 18 and the support membrane 20 is achieved by the fact that the filtration membrane 18 is rotatably mounted to the housing 12 via bearings and operably driven in rotation during use, such as by means of a motor 38 for instance, whereas the support membrane 20 is fixed relative the housing 12 and is fixedly mounted to a cylindrical conduit 21 which protrudes axially into the internal cavity 13 along the axis 44 from the filtrate outlet 22.

Figure 2:
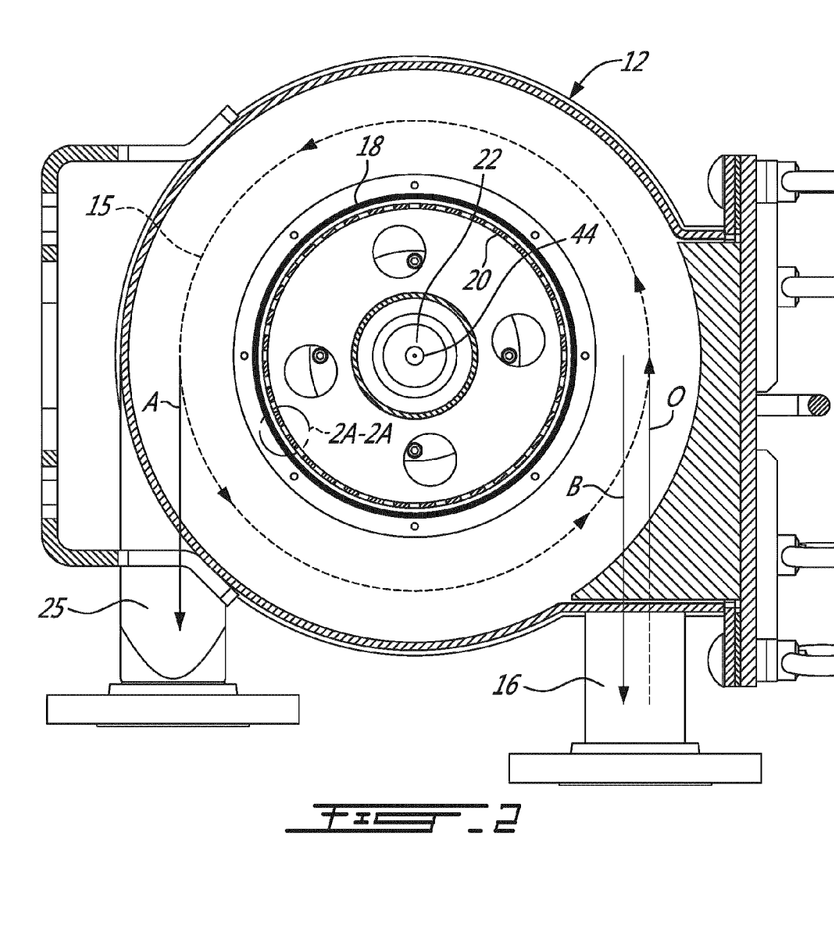
FIG. 2 is a schematic transversal cross-section view, taken along cross-section lines 2-2 of FIG. 1, FIG. 2A being an enlarged portion of FIG. 2.

In this embodiment, the rotary movement of the filtration membrane 18 during operation is in the same tangential orientation than the tangential orientation of rotary fluid movement 15 inside the internal cavity 13 (schematized on FIG. 2). Given the viscosity of the fluid and friction with the rotary filtration membrane 18, the rotary movement of the filtration membrane 18 in the same tangential orientation than the tangential orientation of rotary fluid movement 15 contributes to the angular velocity of rotary fluid movement 15 of the fluid and to the centrifugal action, thereby also contributing to allowing the filtration system 10 to operate for a longer period of time before clogging. Optionally, vanes or the like can be provided integral to the rotary filtration membrane 18 to further assist in providing a strong rotary vortex fluid movement. An example of vanes 23 is shown in this embodiment.

To clarify, if need be, what is meant by same tangential direction, reference is made to FIG. 2. An axial orientation can be defined as parallel to the axis 44, a radial orientation can be defined as being normal to the axis 44, and a tangential orientation can be defined as being normal to both the radial orientation and the axial orientation at any spatial coordinate. In FIG. 2, the inlet flow O represents the tangential orientation, and tangential direction of the inlet 14. An example outlet flow is shown at A which although at a different tangential and axial position, is oriented in the same tangential orientation, and tangential direction of the inlet flow O. However, the outlet flow B, although in the same tangential orientation, is in the opposite tangential direction to the tangential direction of inlet flow O. Henceforth, outlet flow A would cooperate with inlet flow O to establish rotary fluid movement 15, or vortex, in the internal cavity 13, whereas being in the opposite tangential direction, using an outlet flow directed as B would not favour rotary fluid movement inside the internal cavity 13, perhaps even impeding it.

Figure 2A:
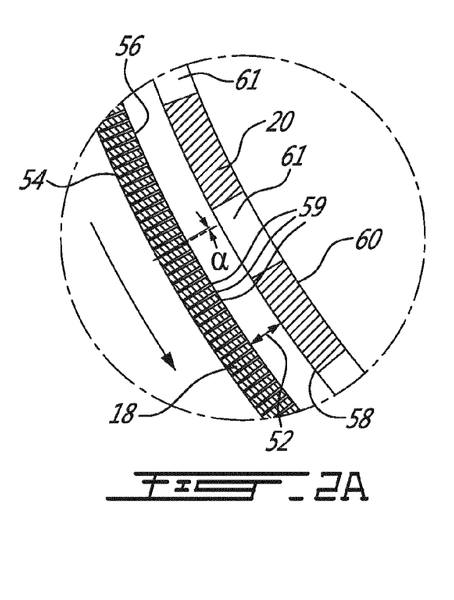

FIG. 2A shows an enlarged view of the filtration membrane 18 and the support membrane 20. The filtration membrane 18 can be seen to be disposed adjacent the support membrane 20, with a spacing distance 52 therebetween, in a manner that upon rotation of the filtration membrane 18, the filtration membrane 18 has a given relative speed with respect to the support membrane 20. The filtration membrane 18 can be said to have an internal face 56 corresponding to an outlet face and facing the support membrane 20 and an opposite external face 54 corresponding to an inlet face, with a filtration membrane thickness radially therebetween. Accordingly, the stationary membrane 20 can be said to have an external inlet face 58 facing the filtration membrane 18 and an opposite, internally facing outlet face 60, with a support membrane thickness extending radially therebetween. The membranes are spaced apart from one another radially by a spacing distance 52 corresponding to a mean radial thickness of the spacing. The filtration membrane 18 can be seen to have a plurality of orifices 59 which have a smaller aperture on an external face 54 thereof and the larger aperture on an internal face 56 thereof. In this embodiment, the orifices 59 are more specifically roughly of 'truncated conical' shape. The support membrane 20 also has a plurality of apertures 61, which are generally cylindrical in this embodiment. An open area of the filtration membrane 18 can be associated to the open area of the external face 54, rather than the open area of the internal face. The open area of the filtration membrane 18 is smaller than an open area of the support membrane 20, which has larger size orifices. The shape, size, and orientation of the orifices of the filtration membrane 18 can have a significant effect on the efficiency of the filter, particularly in aspects such as the amount of time of operation of the filtration system 10 before clogging during regular filtering mode, and efficiency of the declogging mode, the latter of which modes will be explained below. Satisfactory orifices can be achieved by laser drilling of a cylindrical sheet of a metal such as stainless steel, for instance.

Referring to FIGS. 1 and 2, it will be understood that the filtration system 10 can be operated in a regular filtering mode during which, simultaneously, a flow rate of mixed liquid and particulate matter is fed across the inlet 14, the filtration membrane 18 is rotated, and filtered liquid is drawn out from the filtrate outlet 22 as presented above. In the regular mode, the angular speed of the rotary movement 15 of the fluid around the filtration element 17 is significant, and combined with the rotary movement of the filtration membrane 18 and the relative speed and interaction effect between the filtration membrane 18 and the support membrane 20, the particulate matter in the liquid tends to stay substantially away from the filtration membrane 18, and progressively move to the lower portion of the housing movement, while filtered liquid crosses the filtration membrane 18 and is extracted through the filtrate outlet 22. Nonetheless, as fluid eventually reaches the filtration membrane 18, a relatively minor proportion of the particulate matter is drawn therewith and becomes trapped in the apertures. After operating the filter 17 in regular filtering mode during a given period of time, the filtration membrane 18 will therefore eventually become clogged. The amount of time it takes to become clogged can depend on the type of particulate matter and the concentration thereof in the liquid, in addition to factors described above.

Figure 3:
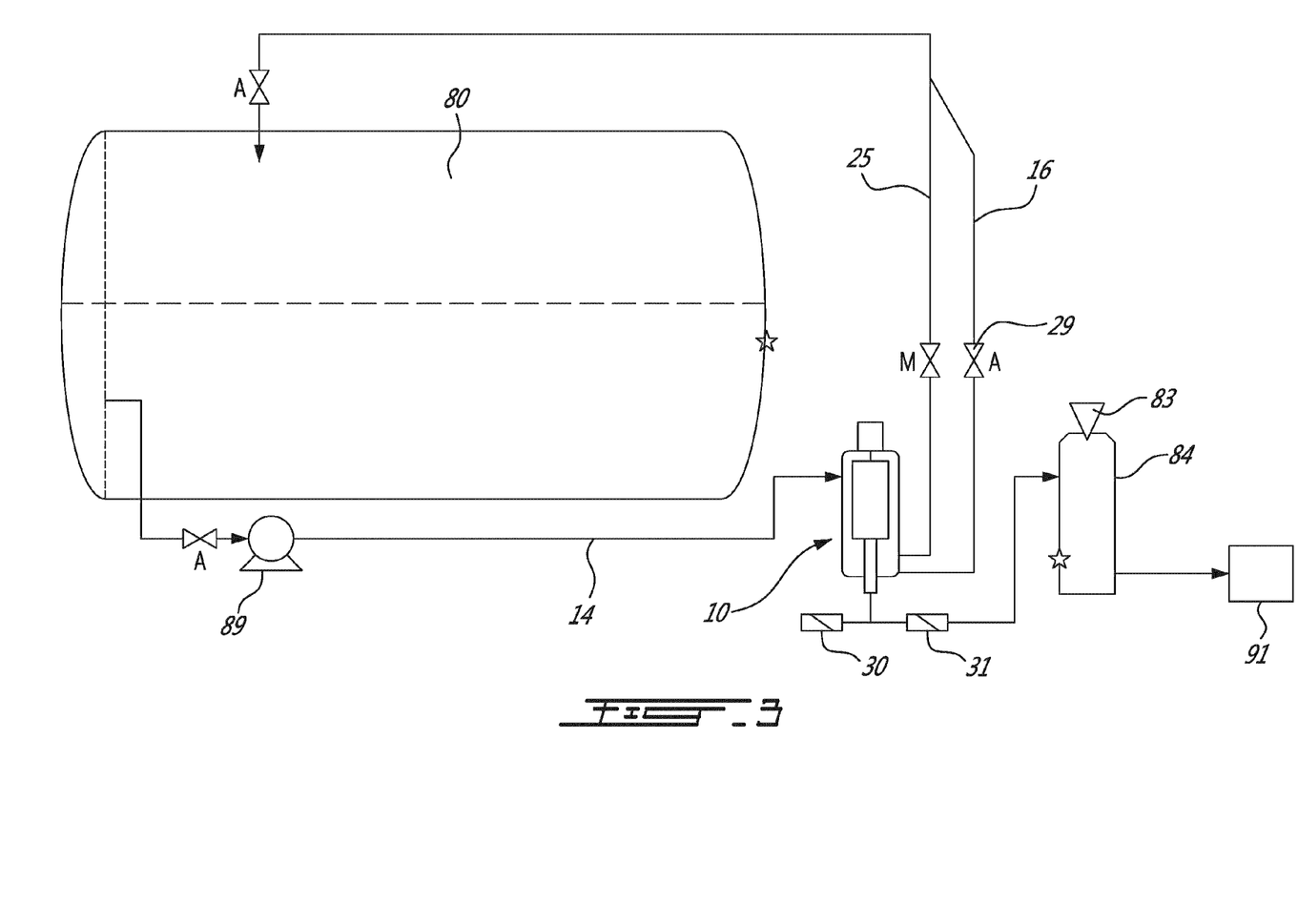
FIG. 3 is a schematic view showing an example use of the filtration system of FIG. 1 where the filtration system can be used in a continuous process.

In the embodiment described above, the filtration system 10 includes means which allow to declog the filtration membrane 18. The mode of operation of the filtration system 10, when it is operated to declog the filtration membrane 18, can be referred to as the declogging mode. The declogging mode can involve opening the clog-control outlet 16 for a greater flow rate to be extracted therefrom than during the regular mode, which can be achieved by operation of a declogging valve 29 associated to the clog-control outlet 16, for instance (it will be noted here that the flow rate out the one or more outlets can be zero or non-zero during regular mode, as will be detailed in the examples described below). The increase of output flow rate has a direct impact on the internal pressure and/or fluid dynamics inside the housing 12. If the increase of output flow rate through the clog-control outlet 16 in the declogging mode is sufficient, it can lead to inversion of flow rate direction at the filtrate outlet 22. In other words, the filtered liquid can flow into the cavity through the filtrate outlet 22 rather than flow out from the cavity. In one embodiment, the filtrate line can be opened to the atmosphere via check valves 30, 31 in a manner that upon flow reversal, check valve 31 in the filtrate outlet line is closed and check valve 30 is open to the atmosphere, via which air is drawn into the cavity to declog the filtration membrane 18, as shown in FIG. 3. More specifically, in this embodiment, a check valve 31 is positioned in the filtrate line, and a bypass line branches off from the filtrate line, leading to the atmosphere via a check valve 30. Tests have shown that air can be more efficient than filtered liquid to declog the filtration membrane 18, and is readily implemented by way of the check valves 30, 31. It will be understood that flow reversal with a liquid rather than air can nonetheless be preferred in some embodiments, and that flow reversal altogether can be omitted in some embodiments.

A controller 41 can be used to trigger the declogging mode periodically, for a given period of declogging time after each given period of regular mode operation has lapsed. Such periodic declogging mode operation can help reduce the risk that the membrane would become clogged. Clogging will typically affect the pressure balance and the flow rate in the filtrate line. Henceforth, using an appropriate sensor 43, the declogging mode can also be triggered upon detecting a clogging event.

As flow is reduced, interrupted, or reversed through the membranes 18, 20, upon operating in declogging mode, particulate matter clogging the filtration membrane 18 will be driven away from the filtration membrane 18 by the reversed flow and/or centrifugal action of the membrane and/or fluid rotation. To allow operation of the filtration system 10 in a (quasi) continuous manner, the flow can be regularly reversed, each time for a short period of time compared to the time elapsed between flow reversals; and/or selectively upon detecting deteriorated flow conditions through the filtrate outlet 22 such as by detecting diminution of the filtrate outlet flow rate below a given threshold, for instance.

Figure 4:
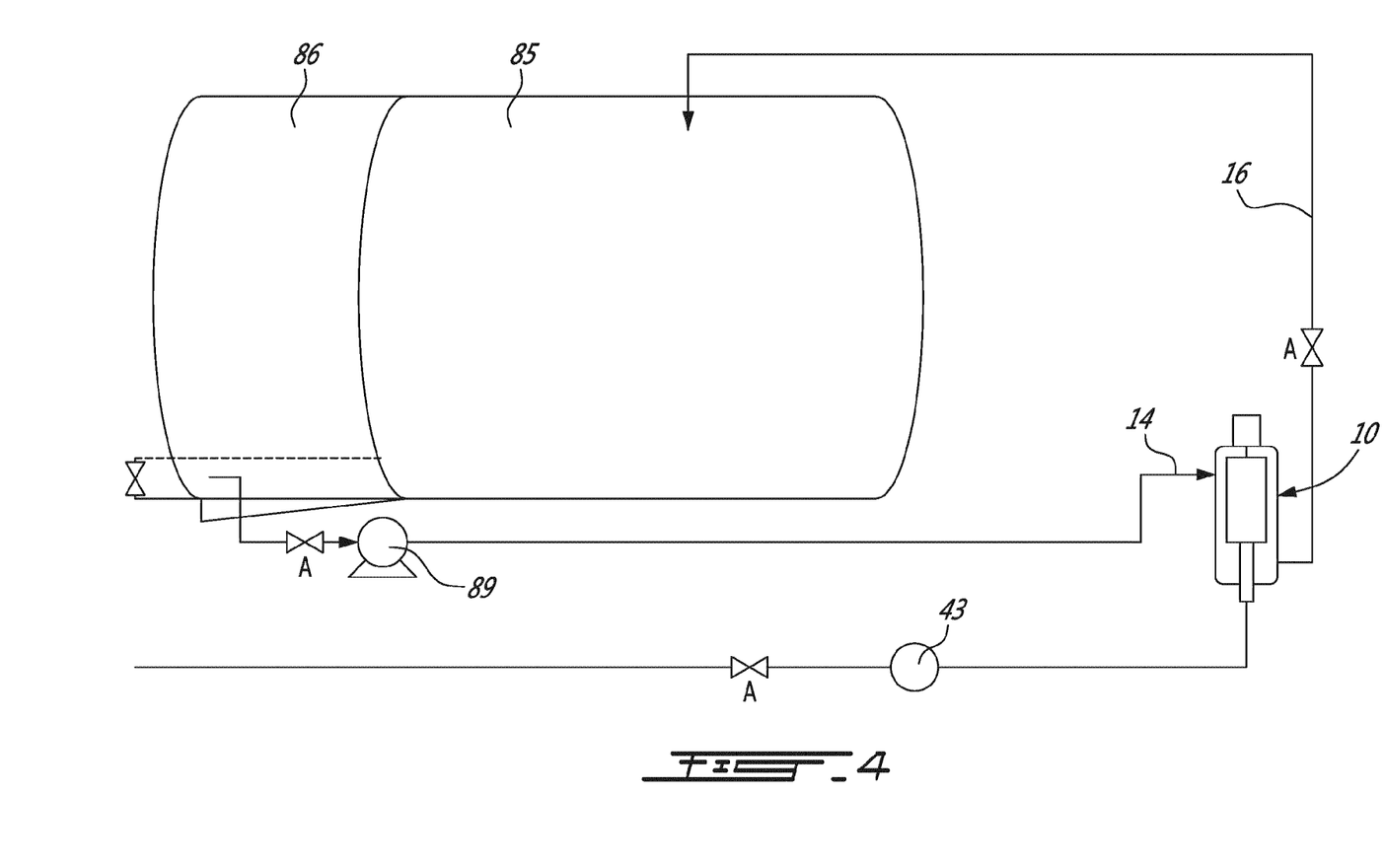
FIG. 4 is a schematic view showing an example use of the filtration system of FIG. 1 where the filtration system can be used in a batch process.

The rotary membrane filter 11 described above with reference to FIGS. 1 and 2 can be used in a continuous process, an example of which is schematized in FIG. 3, or in a batch process, an example of which is schematized in FIG. 4. As will be seen, some adaptations can be made to better adapt the system to one process or the other.

In the continuous process shown in FIG. 3, the fluid inlet 14 is connected to a fluid tank 80, and the filter 11 has a supercharging purge flow rate which is extracted from the cavity during the regular filtering mode, which supercharging purge flow rate is returned to the fluid tank 80. In this embodiment, the filtered fluid is provided in a filtered water reservoir 84 having an air release valve 83. Given the presence of the supercharging purge which is recycled and can be reused, the inlet flow rate can be selected to be relatively high, e.g. 2×, 3× or even more times the filtrate flow rate. The result of such an important relative inlet flow rate is that the rotary fluid flow around the filtration element 17 is consequently very strong, in the sense that the angular velocity of the vortex is relatively high.

In the specific embodiment shown in FIGS. 1 and 2, a significant purge flow rate is extracted from the cavity during the regular filtration mode, via a supercharging outlet 25 which is distinct from the intermittently used clog-control outlet 16. In this embodiment, and as best seen in FIG. 2, the supercharging outlet 25 is oriented in the same tangential orientation than that of the rotary fluid movement 15 in the internal cavity 13, and this orientation contributes to the angular velocity of the rotary fluid flow. Moreover, the outlet 25 is located axially and radially opposite the inlet 14 in the housing 12, at the lower portion of the housing 12, which can impart a continuous (or substantially continuous) helical purge path 15 between the inlet 14 and the outlet and around the filtration membrane 18. The helical shape of the supercharging purge path 15 can contribute to the efficiency of the filter. The clog-control outlet 16 can also be oriented to cooperate with the inlet 14 in establishing a helical purge path 15, though this is not as relevant to the efficiency of the filter than the orientation of the continuous outlet. In fact, in this example, the use of the clog-control valve reverses the flow across the membrane at which point the operation does not depend on a rotary fluid movement; there is thus no need to orient the clog-control outlet in a direction to contribute to a rotary fluid movement.

In alternate embodiments, it will be understood that the supercharging purge flow rate and the intermittent declogging flow rate can be taken from a same outlet, e.g. by adjusting the aperture of a valve between two opening sizes rather than by shutting the valve completely to terminate the declogging mode. Both the clog-control outlet and the supercharging outlet can be referred to as purge outlets, and are both located externally of the filtration element—by contrast with the filtrate outlet which is located internally of the filtration element.

It will also be understood that although the outlet used at least during the regular filtration mode is referred to as a supercharging outlet for the sake of simplicity and to contrast with the expression used to designate the function performed by the intermittently used outlet, the expression supercharging outlet is not to be interpreted restrictively. It will be understood that the flow rate through the recirculation purge can vary during regular filtering mode, and can stop entirely at times as seen fit by designers of specific applications.

During operation, the flow rate ratio between the inlet 14, filtrate outlet 22 and other outlet(s) can be controlled by flow restriction, such as can be imposed, for instance, by the filtration element 17, and configuration and size of the inlet and outlets. Fine tuning during operation, if required, can be achieved by the use of sensors and valves, as will be understood by persons of ordinary skill in the art.

Figure 5:
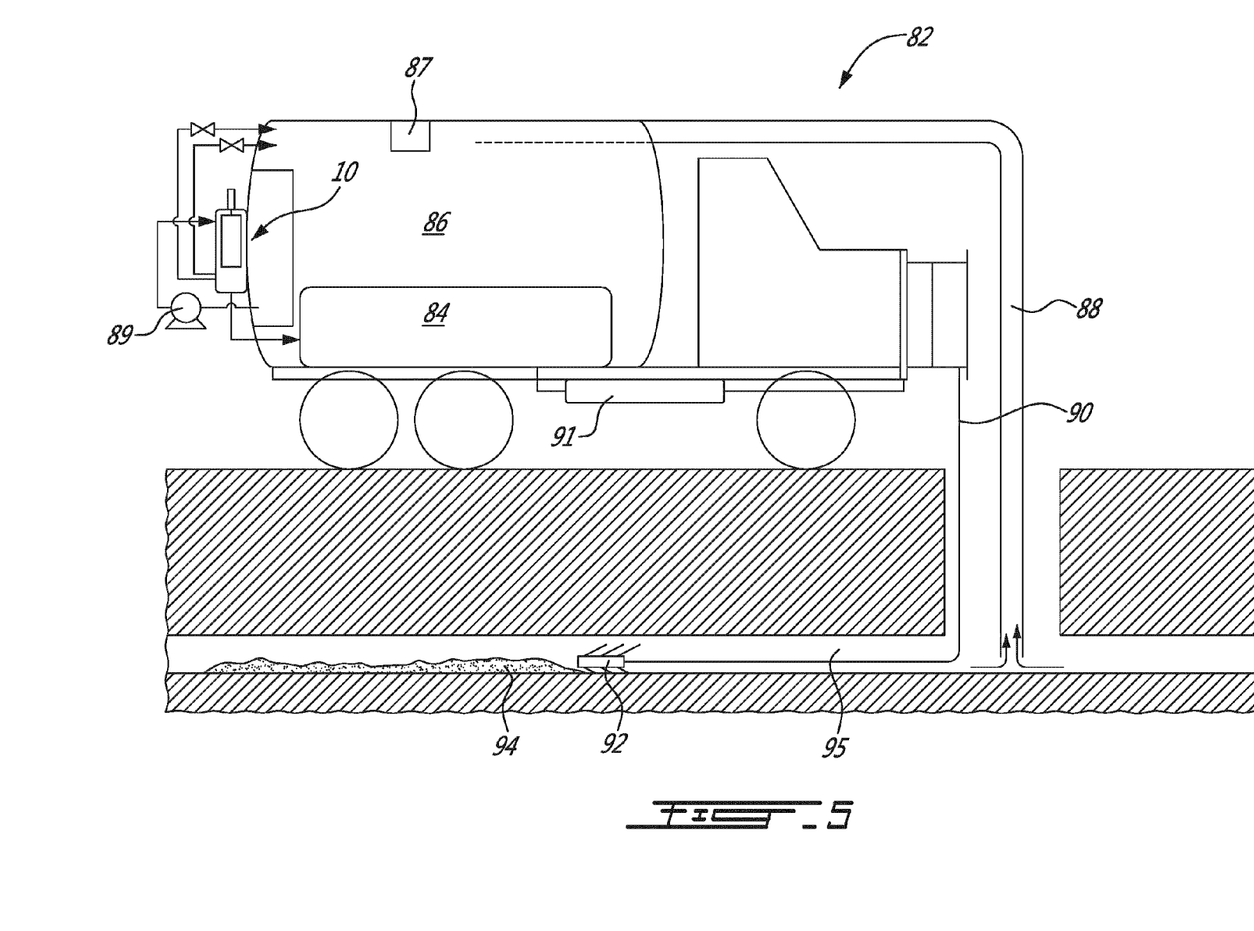
FIG. 5 is a schematic view showing an example use of the filtration system of FIG. 1 in a sewage cleaning vehicle.

The continuous process can be used in cleaning application, such as a sewage cleaning application of FIG. 5, where jets of the filtered water are used to push particulate matter/sludge in the sewers towards an aspiration conduit which aspired the newly formed mix of the particulate matter/sludge and previously filtered water. During operation of such a sewage cleaning embodiment, the aspired fluid is fed into a grey water reservoir and the filtration system 10 is used between the grey water reservoir and a filtered water reservoir leading to the high pressure pump. The filtration system 10 thereby multiplies the amount of clean water available to the high pressure pump while the debris concentration in the grey water reservoir gradually increases. More details of such a sewage cleaning application will be provided in the example presented below.

A batch process is shown in FIG. 4. Such a batch process can be used to remove a filtered volume of liquid from a form of reservoir 86 or container while leaving the particulate matter on site (e.g. in a solid waste compartment 85). Examples of such batch mode applications can include septic tank cleaning (example shown in FIG. 4), emptying lagoons, industrial applications, etc.

In the batch process shown in FIG. 4, an objective is to achieve a high amount of filtered liquid extracted, by achieving a high concentration of particulate matter in the purged fluid. Henceforth, during regular filtering mode, the only outlet which is used is the filtrate outlet 22. The particulate matter concentration in the portion of the cavity around the filtration element 17 increases during the regular filtering mode, and a clog-control outlet 16, with an associated declogging valve 29, is nonetheless also present and the valve is activated intermittently to open the clog-control outlet line and evacuate the high concentration fluid before the level of concentration reaches unsatisfactory high levels more likely to lead to clogging.

For instance, the embodiment shown in FIG. 4 can be applied to a truck used to empty a sludge waste container, such as septic tanks or grease traps for instance, in which case the filtration system 10 is mounted to the truck which is used to empty the sludge waste container (not shown). In this example, the truck returns filtrated grey water from the sludge waste container back to the sludge waste container in order to reduce the volume and weight of waste transported to the waste treatment plant. To this end, the truck can have two compartments: a grey water compartment 86 and a solid waste compartment 85. In the sludge waste container, grey water can be present below greases and other floating matter, and above settled solid waste. Typically, the truck operator begins by pumping the grey water into the grey water compartment 86. The truck operator then pumps solid waste and floating matter into the solid waste compartment 85. Afterwards, the water from the grey water compartment 86 is returned to the sludge waste container using the filtration system 10. The inlet 14 can be connected to the grey water compartment 86, and the clog-control outlet line 16 can be returned to the solid waste compartment 85 of the truck, as shown. A typical septic tank application can satisfactorily use a flow rate of 125 US gpm at 20 psi, with filter element specifications described in the example below, and the clog-control mode can be triggered during 1 second during each 60 seconds of regular filtering mode operation and for 1 second in any event where the inlet pressure exceeds a given set point, or when flow rate at the outlet(s) are lower than a given set point, for instance.

As presented above, FIG. 5 shows an example application where a filtration system 10 such as described above can advantageously be used. In this embodiment, the filtration system 10 is used on a sewage cleaning vehicle 82. The sewage cleaning vehicle 82 has a filtered water reservoir 84, a grey water reservoir 86, a vacuum pump 87, an aspiration conduit 88 leading to the grey water reservoir 86, and a high pressure hose 90 connecting the clean water reservoir 84 to a spray head 92 via a high pressure pump 91. The vacuum pump maintains a partial vacuum in the grey water reservoir 86, typically by blowing air out from the grey water reservoir 86 by above, to provide aspiration to the aspiration conduit 88. The spray head 92 sprays a sufficient amount of water (e.g. at a rate between 60-100 US gpm, more specifically about 80 US gpm in this example), at sufficiently high pressure, to push debris and waste 94 in the sewer 95 toward the aspiration conduit 88 where mixed water, debris and waste are pumped into the grey water reservoir 86. Filtered water is used up relatively quickly and so the filter is thus used to replenish the clean water reservoir 84 from the grey water reservoir 86, to allow continuous operation over a long period of time.

In this particular embodiment, the inlet 14 of the filtration system 10 is fed by water from the grey water reservoir 86 by a transfer pump 89. The transfer pump 89 can have an inlet positioned a given distance from the bottom of the grey water reservoir (e.g. 50 cm), and distant from the aspiration conduit outlet. A grating (more specifically a ~10 mm hole grating) is used in this embodiment to partition a subchamber of the grey water reservoir where the inlet is connected from the remainder of the grey water reservoir, and to pre-filter the grey water which is fed to the filter. Henceforth, before reaching the filtration system 10, dense solid matter typically has settled down to the bottom of the grey water reservoir 86 and floating matter floats above and is prefiltered by the grating, leaving a somewhat prefiltered grey water as the inlet fluid of the filtration system 10 where the filtration action can begin as detailed above. The supercharging outlet(s) return to the grey water reservoir 86 and the filtrate outlet 22 is fed to the filtered water reservoir 84. In another embodiment, the grating can be a conduit having chicane-configured paths therein.

The following specifications are considered to provide an example of a satisfactory configuration for a sewage cleaning vehicle 82 such as described above, where the partial vacuum is maintained at between 10 and 20 inches Hg (i.e. between about 35 kPa and 70 kPa) by the vacuum pump 87.

This example uses a rotary filtration membrane 18 made of a cylindrical sheet of stainless steel having 2.67 mm thickness, perforated for a filtration of 100 microns (absolute) with orifices having a large end on the internal face having a diameter of 0.22 mm and a small end on the external face having a diameter of 0.10 mm, the internal surface of the orifices forming an angle of $\alpha \approx 2°$ with respect to the radial orientation, the aperture pattern of the filtration membrane can be described by lattice where each hole has six adjacent holes angularly equally spaced by 60 degrees and distanced by a length of 0.353 mm and where two radially adjacent holes are separated by 0.353 mm and two axially adjacent holes are separated by 0.306 mm, an open area of 7.5%, an internal diameter of 190 mm, a height of 291 mm and rotated at between 2000 and 2500 rpm (more specifically about 2300 rpm in this specific example); an interior support membrane 20 also made of stainless steel, having 3.2 mm thickness, cylindrical apertures having between 3 and 6 mm (5 mm in this specific example), an exterior diameter of 186 mm (resulting in a 2 mm spacing distance), and a height of 273 mm. The housing 12 being also made of stainless steel, having a cylindrical internal diameter of 346 mm, a height of 393 mm, an inlet 14 having a 76 mm diameter opening located axially at the top of the housing 12, the filtrate outlet 22 having a 76 mm diameter opening, the clog-control outlet 16 having a 51 mm opening located at the bottom of the housing 12, in the tangential orientation and direction referred to above, and an optional supercharging outlet 25 also having a 51 mm opening. It will be understood that all these values are simply provided for full description of the example, and that different values can be used in alternate embodiments; for instance a 200 micron version of the perforations forms an example of an alternate embodiment, where a greater open area was desired.

The transfer pump 89 is used to generate a flow of between 250 and 350 US gpm, more specifically 325 US gpm in this example through the filter inlet 14. Flow restriction, by way of the configuration of the outlets 16, 22, 25 and the particularities of the filtration element 17, acts generally to divert a portion of the flow rate between the supercharging outlet 25 and the filtrate outlet 22. The clog-control outlet 16 is kept closed during regular operation. Fine tuning of the flow rate proportion can be established by way of controlling the opening of the outlets 25, 22, which can be done using a fixed diameter opening plate for instance, or by way of a valve. In this embodiment, a fixed flow rate restriction is provided at the supercharging outlet 25, but a declogging valve 29 is used to control flow restriction at the clog-control outlet 16, which, combined with the action of the transfer pump 89, can maintain a pressure of about 30 psi at the inlet 14 of the internal cavity 13 for instance, and control the filtrate outlet rate of flow to about 80 US gpm (about 0.4 m$^3$/min), the remainder of the flow exiting the supercharging outlet 25, i.e. about 250 US gpm (about 0.7 m$^3$/min) subsequent to a rotary motion in the internal cavity 13 which generates the vortex action in combination with the rotation of the rotary filtration membrane 18 and its associated impeller or vanes 23.

In this embodiment, a controller 41 is provided with an incorporated timer which can automatically open the clog-control outlet 16 by activating an associate declogging valve 29 for a period of 1 second each 6 seconds, and 4 seconds every 30 seconds, which was found to satisfactorily release the internal pressure of the filter and draw a reverse flow of filtered water and air via the filtrate outlet 22 to free the organic or inorganic particulate solids which can block the orifices in the external rotary membrane 18. The clean water reservoir 84 is optional, and the filtrate outlet 22 can be connected directly to the high pressure pump 91 in an alternate embodiment. The reverse flow through the filtrate outlet can be of the order of 100-150 US gpm for instance. In other embodiments still, rather than generating a reverse flow through the filtrate outlet, the flow through the filtrate outlet 22 can simply be reduced, or stopped, for instance, which can still satisfactorily relieve the filtration membrane 18 in certain applications. In one embodiment, the reversed flow is composed of air rather than liquid.

In this embodiment, an optional flow rate sensor 43 is provided downstream of the filtrate outlet 22 to establish the flow rate therein. The input of this flow rate sensor 43 can be received by the controller 41 which can have an integrated comparator and can further trigger the opening of the clog-control outlet 16 at any time where the flow rate is detected to have fallen below a certain threshold value indicative of deteriorated flow rate conditions. The threshold value can be set at a value of 40-80% of the normal flow rate for instance.

The resulting performance is a filtration system 10 which can offer a filtering efficiency of 100 microns (absolute) at 80 US gpm of filtrate flow rate in a continuous, or quasi-continuous manner, thereby offering both a better filtering efficiency and a more continuous filtration operability than many former filtration systems.

It will be understood by persons skilled in the art that the scale of the filter can vary in order to accommodate different scenarios. When scaling the filter, the rotation speed of the filtering membrane can be adjusted as a function of its diameter in order to achieve comparable relative speeds between the filtering membrane 18 and the support membrane 20 such as described above. It will be understood that the relative rotation speed in the example described above, at 2300 RPM, is of about 1375 m/s. The relative rotation speed can thus be between 1100 and 1500 m/s in alternate embodiments, for instance. Persons skilled in the art will also readily understand that, especially in upscaled embodiments, similar ratios of flow rates can be achieved by a combination of more than one inlet, more than one supercharging outlet, and/or more than one clog-control outlet, for instance.

The filtration system 10 can optionally be adapted to other uses than the ones described above, such as: fixed or mobile applications for treating municipal waste water or industrial water, undertaking lagoon draw-off operations, or as primary filtration systems for tar sand treatment water, to name a few examples.

Figure 6:
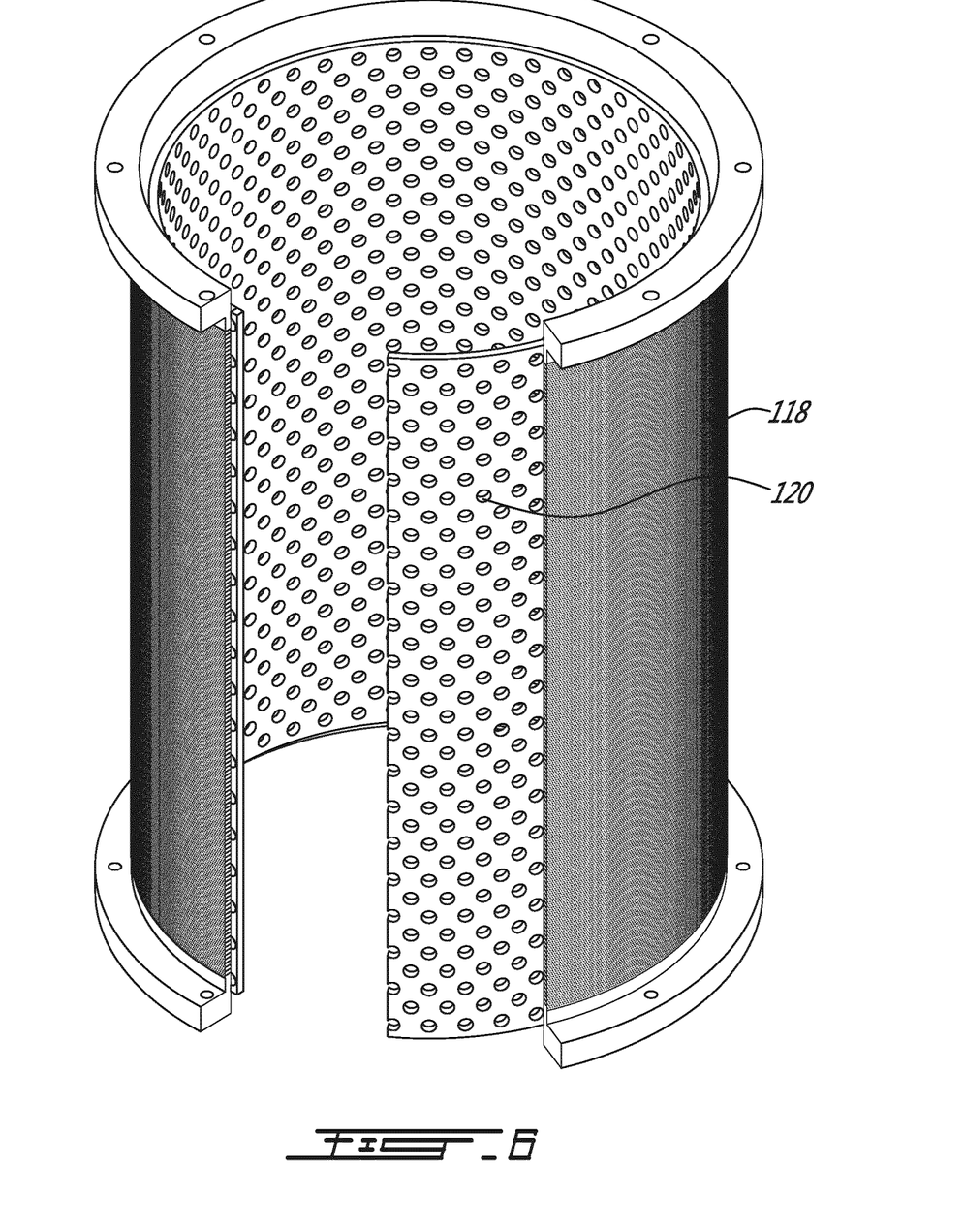
FIG. 6 and FIG. 7 show example embodiments of filtering membrane and support membrane combinations, fragmented to show detail.
Figure 7:
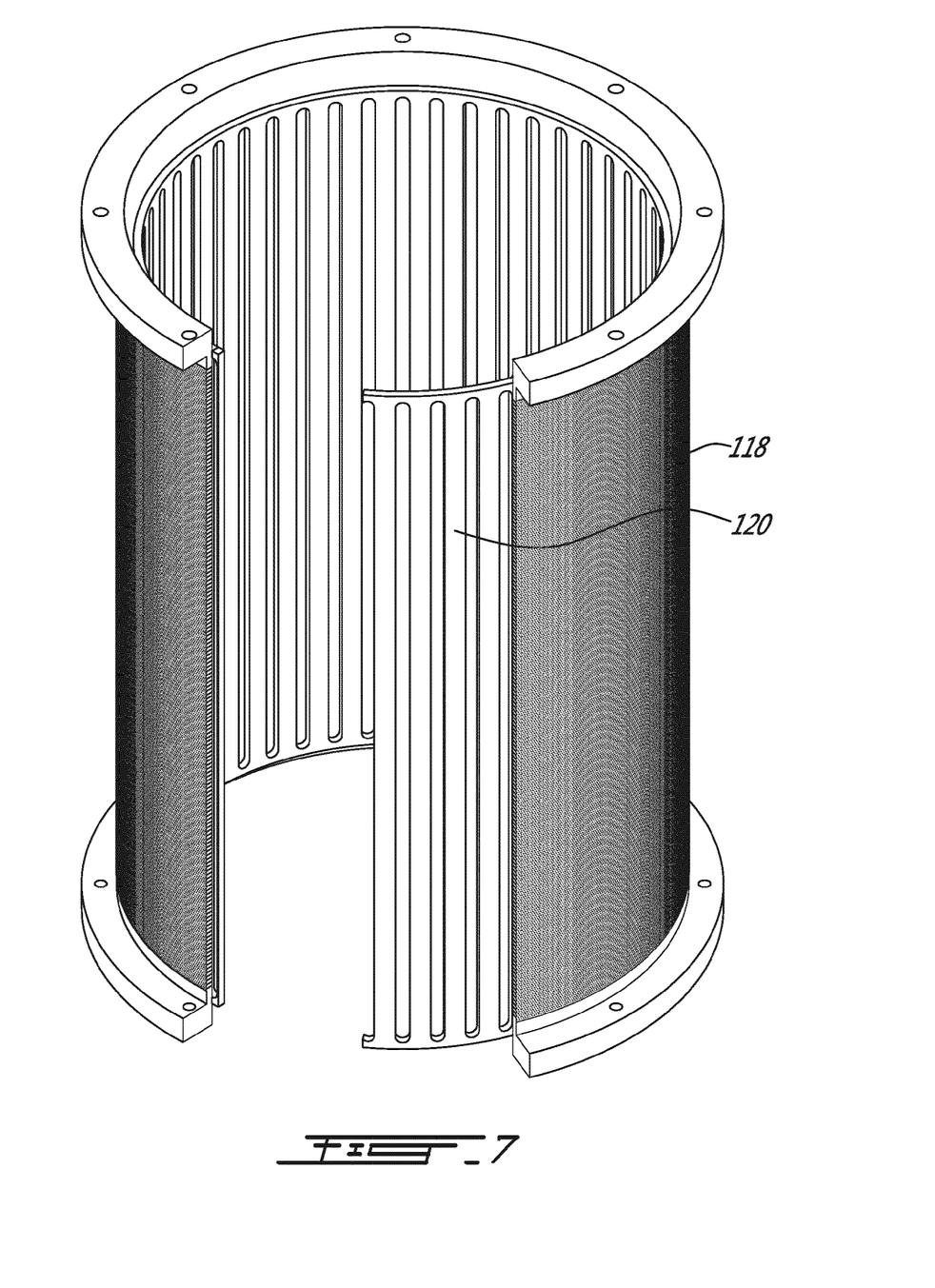

FIG. 6 and FIG. 7 show example embodiments of filtering membrane 118 and support membrane 120 combinations, fragmented to show detail.

As can be seen therefore, the examples described above and illustrated are intended to be exemplary only. The scope is indicated by the appended claims.

What is claimed is:

1. A method of operating a filtration system for separating particulate solid matter from a liquid and having a housing having a surface of revolution shaped cavity therein defined around an axis, the cavity housing a filter element including a filtration membrane and a support membrane mounted concentrically around the axis with the filtration membrane being rotatably mounted to the housing externally to the support membrane, the housing also having a filtrate outlet located inside the filter element, an inlet and at least one purge outlet, the inlet and the at least one purge outlet both being located outside the filter element; the method comprising:

operating the filtration system in a regular filtration mode including simultaneously:
feeding an inlet flow rate tangentially into the cavity through the inlet and extracting a purge flow rate across the at least one purge outlet, thereby entraining a rotary fluid flow around the filtration element, in a rotary fluid flow angular direction;
rotating the filtration membrane about the axis, in the rotary fluid flow angular direction, at a rotation speed relative to the support membrane;
extracting a filtrate flow rate sequentially across the rotating filtration membrane, the support membrane, and the filtrate outlet; and, subsequently
temporarily operating the filtration system in a declogging mode including:
extracting a greater purge flow rate through the at least one purge outlet than during the regular filtration mode.

2. The method of claim 1 wherein the declogging mode includes reversing the flow direction across the filtrate outlet as compared to the regular filtration mode.

3. The method of claim 2 wherein the declogging mode includes feeding air into the cavity across the filtrate outlet.

4. The method of claim 1 wherein the relative rotation speed is of between 1100 m/s and 1500 m/s.

5. The method of claim 1 wherein the relative rotation speed is of about 1375 m/s.

6. The method of claim 1 comprising periodically interrupting the regular filtration mode by performing the declogging mode for a given period of time.

7. The method of claim 1 further comprising sensing a flow rate through the filtrate outlet, comparing the sensed flow rate to a given threshold, and triggering said temporary declogging mode upon detecting that the sensed flow rate is below the given threshold.

8. The method of claim 1 wherein the flow rate through the at least one purge outlet is nil during the regular operation mode.

9. The method of claim 1 wherein the flow rate through the at least one purge outlet is higher than the flow rate through the filtrate outlet during the regular filtration mode.

10. The method of claim 9 wherein the flow rate of through the at least one purge outlet during the regular filtration mode is maintained at least twice higher than the flow rate of the filtrate outlet during the regular filtration mode.

11. The method of claim 9 wherein the flow rate extracted through the at least one purge outlet during the regular filtration mode is extracted tangentially in the rotary fluid flow angular direction, thereby cooperating with the inlet flow rate in entraining the rotary fluid flow.

12. The method of claim 9 wherein said regular filtration mode further comprises,
pumping from a reservoir to feed said flow rate into said inlet;
returning said flow rate from the at least one purge outlet to the reservoir.

13. The method of claim 12 further comprising
maintaining a vacuum in the reservoir, and aspiring grey water into said reservoir via an aspiration conduit.

14. The method of claim 13 further comprising
pumping jets of clean water from a clean water reservoir associated to a vehicle and connected to the filtrate outlet into a sewage conduit, thereby pushing debris and water to feed the aspiration conduit.

15. The method of claim 1 wherein said regular filtration mode further comprises:
pumping grey water from a grey water container on a vehicle to feed said flow rate into said inlet; and
feeding the filtrate flow rate into a sludge container; and
wherein the declogging mode further comprises feeding the purge flow rate to a solid waste container on the vehicle.

16. The method of claim 1 wherein the filtration membrane further comprises vanes, and wherein said rotating the filtration membrane includes rotating the vanes to contribute to the rotary fluid flow around the filtration element.

17. A method of operating a filtration system for separating particulate solid matter from a liquid and having a housing having a surface of revolution shaped cavity therein defined around an axis, the cavity housing a filter element including a filtration membrane and a support membrane mounted concentrically around the axis with the filtration membrane being rotatably mounted to the housing externally to the support membrane, the housing also having a filtrate outlet located inside the filter element, an inlet and at least one purge outlet, the inlet and the at least one purge outlet both being located outside the filter element; the method comprising:
operating the filtration system in a regular filtration mode including simultaneously:
feeding an inlet flow rate tangentially into the cavity through the inlet and extracting a purge flow rate across the at least one purge outlet, thereby entraining a rotary fluid flow around the filtration element, in a rotary fluid flow angular direction;
rotating the filtration membrane around the axis in the rotary fluid flow angular direction, at a rotation speed relative to the support membrane; and
extracting a filtrate flow rate sequentially across the rotating filtration membrane, the support membrane, and the filtrate outlet.

* * * * *